US006973785B2

(12) United States Patent
Umehara et al.

(10) Patent No.: US 6,973,785 B2
(45) Date of Patent: Dec. 13, 2005

(54) APPARATUS AND METHOD FOR CONTROLLING EGR IN AN ENGINE

(75) Inventors: Tsutomu Umehara, Kariya (JP); Masaaki Yamaguchi, Okazaki (JP); Hiroki Kinuhata, Aichi-ken (JP)

(73) Assignee: Kabushiki Kaisha Toyota Jidoshokki, Kariya (JP)

( * ) Notice: Subject to any disclaimer, the term of this patent is extended or adjusted under 35 U.S.C. 154(b) by 0 days.

(21) Appl. No.: 10/607,605

(22) Filed: Jun. 27, 2003

(65) Prior Publication Data

US 2004/0134192 A1    Jul. 15, 2004

(30) Foreign Application Priority Data

Jun. 28, 2002 (JP) .............................. 2002-191061

(51) Int. Cl.[7] .......................... F02B 33/44; F02B 37/22; F02D 21/08; F02M 25/07
(52) U.S. Cl. .............................. 60/605.2; 123/568.11; 123/568.21; 701/108
(58) Field of Search ............... 60/605.2; 123/568.11, 123/568.21, 568.18, 568.19, 568.2, 568.22–568.32; 701/108

(56) References Cited

U.S. PATENT DOCUMENTS

| | | | | |
|---|---|---|---|---|
| 4,947,820 A | * | 8/1990 | Kushi .................... | 123/568.29 |
| 5,213,087 A | * | 5/1993 | Sausner et al. ......... | 123/568.19 |
| 5,921,224 A | * | 7/1999 | Sinnamon .............. | 123/568.21 |
| 5,934,249 A | * | 8/1999 | Nanba et al. .......... | 123/568.21 |
| 6,076,502 A | * | 6/2000 | Katashiba et al. ..... | 123/568.16 |
| 6,148,616 A | * | 11/2000 | Yoshida et al. ........... | 60/605.2 |
| 6,212,881 B1 | * | 4/2001 | Takahashi et al. ...... | 123/568.21 |
| 6,230,697 B1 | * | 5/2001 | Itoyama et al. ........ | 123/568.21 |
| 6,604,361 B2 | * | 8/2003 | Buckland et al. ........... | 60/605.2 |
| 6,688,279 B2 | * | 2/2004 | Ishikawa et al. ....... | 123/568.11 |
| 6,725,832 B2 | * | 4/2004 | Yokoyama et al. .... | 123/568.21 |
| 2001/0035151 A1 | * | 11/2001 | Shibagaki ............... | 123/568.21 |

FOREIGN PATENT DOCUMENTS

| | | | | |
|---|---|---|---|---|
| JP | 55-148950 | | 11/1980 | .......... F02M 25/06 |
| JP | 01063655 A | * | 3/1989 | ............. F09P 5/15 |
| JP | 02125954 A | * | 5/1990 | .......... F02M 25/07 |
| JP | 08-270454 | | 10/1996 | .......... F02B 37/24 |
| JP | 10-238412 | | 9/1998 | .......... F02M 25/07 |
| JP | 2000-337172 | | 12/2000 | ............. F02D 9/02 |

\* cited by examiner

Primary Examiner—Sheldon J Richter
(74) Attorney, Agent, or Firm—Morgan & Finnegan, LLP (57) ABSTRACT

An engine including a recirculation passage, which connects an exhaust passage to an intake passage, and an EGR valve arranged in the recirculation passage. An electronic control unit (ECU) obtains a target opening degree of the EGR valve in accordance with an operating state of the engine and controls the EGR valve so that the opening degree of the EGR valve becomes equal to the obtained target opening degree. When opening the EGR valve from a fully closed state, the ECU restricts the opening degree of the EGR valve to a restricted opening degree that is smaller than the target opening degree during a predetermined delay time before actuating the EGR valve to the target opening degree. This prevent exhaust gas from being excessively recirculated to the intake passage even if the difference between the exhaust pressure and the intake pressure is too large when starting EGR.

33 Claims, 8 Drawing Sheets

APPARATUS AND METHOD FOR CONTROLLING EGR IN AN ENGINE

BACKGROUND OF THE INVENTION

The present invention relates to an apparatus and method for controlling exhaust gas recirculation (EGR) in an engine, and more particularly, to controlling of an EGR valve that adjusts the EGR amount.

Japanese Laid-Open Patent Publication Nos. 55-148950, 10-238412, and 2000-337172 describe vehicle engines incorporating exhaust gas recirculation (EGR) apparatuses. An EGR apparatus includes a recirculation passage, which connects an exhaust passage of the engine to an intake passage of the engine, and an EGR valve, which is arranged in the recirculation passage. When the EGR valve is opened, the difference between the pressures of the upstream side and downstream side of the EGR valve sends exhaust gas from the exhaust passage to the intake passage through the recirculation passage. The exhaust gas in the intake passage lowers the combustion temperature in the combustion chambers of the engine and suppresses the production of nitrogen oxides (NOx).

Japanese-Laid-Open Patent Publication No. 8-270454 describes a vehicle engine incorporating a variable geometry turbocharger and an EGR apparatus. The variable geometry turbocharger includes a turbine, which is provided with variable vanes, and is arranged in the exhaust passage. The opening degree of the variable vanes are varied to produce supercharged pressure even at low engine speeds. Thus, the engine produces high power from low speed ranges.

The EGR amount is determined from the EGR valve opening degree and the difference between the pressures at the upstream side and downstream side of the EGR valve. An electronic control unit (ECU) installed in a vehicle obtains the fuel injection amount based on the operating state of the engine and obtains a target opening degree of the EGR valve corresponding to the fuel injection amount from a predetermined formula used for feedback control. The ECU feedback controls the EGR valve so that the opening degree of the EGR valve becomes equal to the target opening degree. The formula is set under the assumption that the difference between the pressures at the upstream side and downstream side of the EGR valve is normal. That is, the EGR valve target opening degree, which is obtained through the formula, achieves the optimal EGR amount when the pressure difference is in a normal state.

Further, the ECU determines whether to perform EGR in accordance with the operating state of the engine. When determining to perform EGR, the ECU actuates the EGR valve from a fully closed state to the target opening degree.

For example, in a diesel engine incorporating a variable geometry turbocharger, if the depressed acceleration pedal is released when the engine is in a high speed high load state and then immediately depressed again to accelerate the engine speed, the difference between the exhaust pressure and the intake pressure temporarily becomes greater than the normal value. If the EGR valve is opened in this state, a greater amount of exhaust gas is recirculated to the intake passage in comparison with when the difference between the exhaust pressure and the intake pressure is in a normal state. This releases fumes from the exhaust passage.

More specifically, when the depressed acceleration pedal is released in a state in which the engine speed is high, fuel injection is stopped. Further, the EGR valve and the throttle valve are closed. In this state, the variable vanes of the variable geometry turbocharger are controlled to increase the opening degree. However, the movement of the variable vanes, which are driven through feedback control, is delayed from the change in the fuel injection amount, which is controlled in accordance with the depressed amount of the acceleration pedal, the actuation of the throttle valve, and the actuation of the EGR valve, which is controlled in accordance with the fuel injection amount. Thus, in a short period from when the acceleration pedal is depressed, the EGR valve is closed but the variable vanes are virtually not moved in the opening direction.

The exhaust pressure in the exhaust passage increases in a state in which the EGR valve is closed and the variable vanes are not moved in the opening direction. The intake pressure in the intake passage decreases immediately after the depressed acceleration pedal is released since the throttle valve moves in its closing direction when inertia continues to operate the engine in a high speed state. This produces an excessive difference between the exhaust pressure at the upstream side of the closed EGR valve and the intake pressure at the downstream side of the closed EGR valve.

When the depressed acceleration pedal is released and then depressed again within a short period of time, the variable vanes are maintained at a relatively small opening degree until the intake pressure of the intake passage, or the supercharged pressure, reaches its target value. As the rotating speed of the turbine increases and the intake pressure reaches its target value, the variable vanes move in the opening direction. Due to inertia, a certain period of time is required for the rotating speed of the turbine to increase. Thus, the variable vanes do not move immediately in the opening direction even if the acceleration pedal is depressed again. Accordingly, if the EGR valve is opened from a fully closed state when the acceleration pedal is depressed again, the excessive difference between the exhaust pressure and the intake pressure causes excessive recirculation of the exhaust gas to the intake passage. This discharges fumes from the exhaust passage.

Such events are prominent in diesel engines incorporating variable geometry turbochargers. However, even in a diesel engine incorporating a fixed geometry turbocharger or a diesel engine that does not incorporate a turbocharger, when the acceleration pedal is manipulated in a manner that suddenly changes the engine operating state, the excessive difference between the exhaust pressure and the intake pressure may produce fumes.

SUMMARY OF THE INVENTION

It is an object of the present invention to provide an apparatus and method for controlling EGR in an engine that enables optimal control of the EGR amount.

To achieve the above object, the present invention provides an apparatus for controlling recirculation of exhaust gas from an exhaust passage of an engine to an intake passage of the engine. The apparatus includes a recirculation passage connecting the exhaust passage to the intake passage. An EGR valve is arranged in the recirculation passage. The EGR valve varies its opening degree to adjust the amount of exhaust gas recirculated from the exhaust passage to the intake passage. A controller controls the EGR valve. The controller obtains a target opening degree of the EGR valve in accordance with an operating state of the engine and controls the EGR valve so that the opening degree of the EGR valve becomes equal to the obtained target opening degree. When opening the EGR valve from a fully closed state, the controller performs EGR primary control to restrict the opening degree of the EGR valve to a restricted opening degree that is smaller than the target opening degree during a predetermined delay time before actuating the EGR valve to the target opening degree.

A further aspect of the present invention is a method for controlling recirculation of exhaust gas from an exhaust passage of an engine to an intake passage of the engine. The method includes varying an opening degree of the EGR valve to adjust the amount of exhaust gas recirculated from the exhaust passage to the intake passage through a recirculation passage, obtaining a target opening degree of the EGR valve in accordance with an operating state of the engine, controlling the EGR valve so that the opening degree of the EGR valve becomes equal to the obtained target opening degree, and, when opening the EGR valve from a fully closed state, restricting the opening degree of the EGR valve to a restricted opening degree that is smaller than the target opening degree during a predetermined delay time before actuating the EGR valve to the target opening degree.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A first embodiment according to the present invention that is applied to a diesel engine system of a vehicle will now be discussed with reference to FIGS. 1 to 5.

Figure 1:
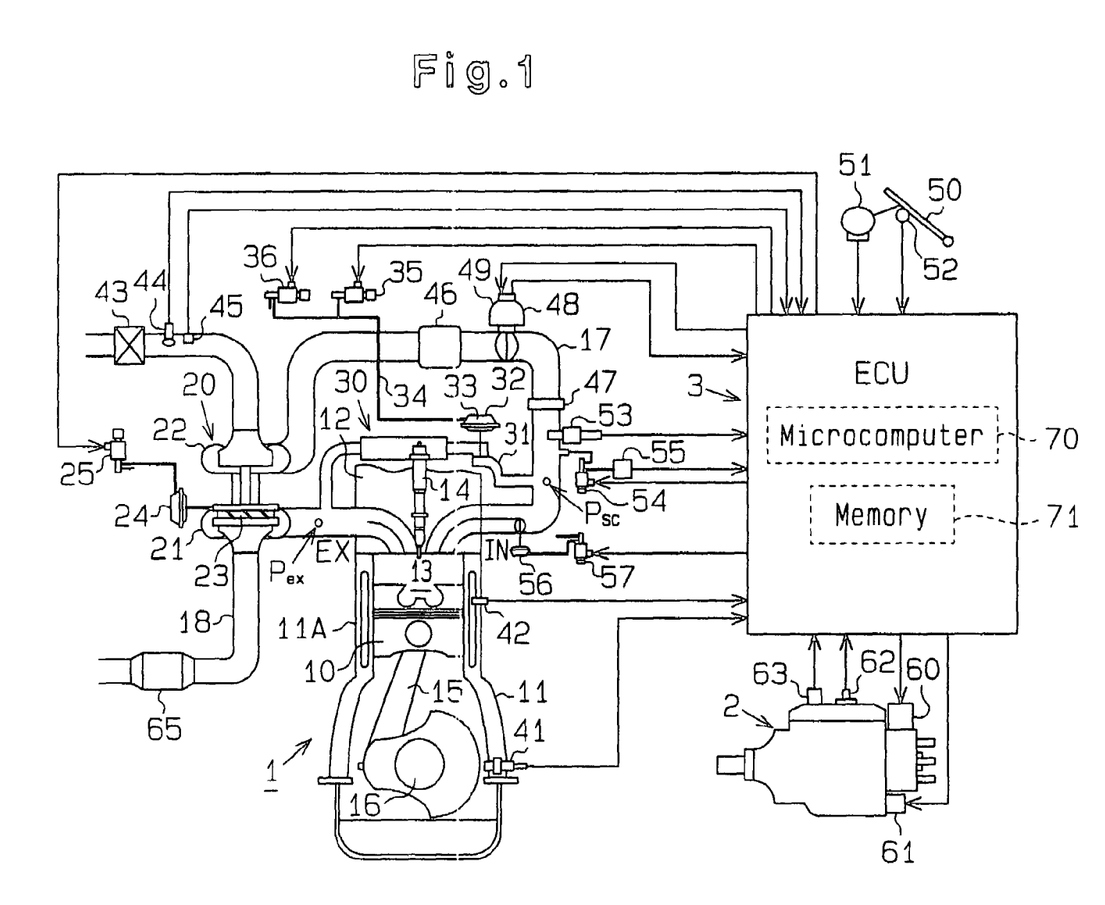
FIG. 1 is a schematic diagram of a diesel engine system according to a first embodiment of the present invention.

Referring to FIG. 1, the diesel engine system includes a diesel engine 1, a fuel injection pump 2, and an electronic control unit (ECU) 3, which controls the diesel engine 1 and the fuel injection pump 2.

The diesel engine 1 includes a plurality of (only one shown in FIG. 1) cylinders 11A with each cylinder 11A accommodating a piston 10. In each cylinder 11A, a combustion chamber 13 is defined between the corresponding piston 10 and a cylinder head 12. A plurality of fuel injection nozzles 14 are arranged in correspondence with the cylinders 11A along the cylinder head 12. Each fuel injection nozzle has a fuel injection port that is exposed in the corresponding combustion chamber 13. Pressurized fuel sent through a fuel passage (not shown) from the fuel injection pump 2 is injected from the fuel injection nozzle 14 into the corresponding combustion chamber 13. The ignition of air-fuel mixture in the combustion chamber 13 reciprocates the piston 10 in the corresponding cylinder 11A. A connecting rod 15 converts the reciprocation of the piston 10 to rotation of a crankshaft (output shaft) 16. The engine 1 includes an intake passage 17, which is connected to intake ports of the cylinders 11A, and an exhaust passage 18, which is connected to exhaust ports of the cylinders 11A.

The diesel engine 1 includes a variable geometry turbocharger 20, which serves as a supercharger. The variable geometry turbocharger 20 supercharges air from low speed ranges of the engine 1 and increases the torque of the engine 1 at low speeds. The variable geometry turbocharger 20 includes a turbine 21, which is arranged in the exhaust passage 18, and a compressor 22, which is arranged in the intake passage 17. The compressor 22, which is driven by the rotation torque produced by the turbine 21, supercharges the air in the intake passage 17 toward the cylinders 11A.

A plurality of variable vanes 23 are arranged in the turbine 21 to adjust the flow rate of the exhaust gas passing through the turbine 21. The variable vanes 23 are arranged about the axis of the turbine 21 and are supported so that they may be opened and closed. The variable vanes 23 function as a variable nozzle. A rotation torque, which is in accordance with the flow rate of the exhaust gas, is applied to the compressor 22. The flow rate of the exhaust gas is determined by the pressure of the exhaust gas in the exhaust passage 18 and the opening degree of the variable vanes 23 (i.e., opening degree of the variable nozzle). The variable vanes 23 are driven by a diaphragm type actuator 24.

The actuator 24 is connected to a vacuum pump (not shown), which functions as a negative pressure source, via an electric vacuum regulating valve (EVRV) 25. The EVRV 25 adjusts the negative pressure produced by the vacuum pump to move the variable vanes 23 with the actuator 24 in a closing direction or opening direction. This varies the opening degree of the variable vanes 23, or the opening degree of the variable nozzle (VN degree). The VN degree adjusts the flow rate of the exhaust gas passing through the turbine 21. This, in turn, changes the supercharged pressure produced by the compressor 22. For example, a decrease in the VN degree increases the force driving the compressor 22 and raises the resulting supercharged pressure. On the other hand, an increase in the VN degree decreases the force driving the compressor 22 and lowers the resulting supercharged pressure. The VN angle is controlled in accordance with the operating state of the engine 1 to produce the supercharged pressure that is optimal for the operating state of the engine 1. This increases the torque of the engine 1 in the low speed range and improves the starting capability of the vehicle.

The engine 1 includes an exhaust gas recirculation (EGR) device 30. The EGR device 30 returns some of the exhaust gas to the intake passage 17 to lower the combustion temperature in the combustion chambers 13 and reduce the nitrogen oxides (NOx) included in the exhaust gas. The EGR device 30 includes a recirculation passage 31, which is connected to the intake passage 17, and an EGR valve 32, which is arranged in the recirculation passage 31. The recirculation passage 31 connects the part of the exhaust passage 18 that is upstream to the turbine 21 to the part of the intake passage 17 that is downstream to the compressor 22. The EGR valve 32 includes a diaphragm type actuator 33 driven by negative pressure. A passage 34 connects the actuator 33 to an output port of a vacuum switching valve (VSV) 35 and an output port of an electric vacuum regulating valve (EVRV) 36.

The EVRV 36 is a three-way electromagnetic valve, the opening degree of which is adjusted through duty control, and includes an input port, which is connected to a vacuum pump (not shown), and an atmospheric port, which is opened to the atmosphere. The EVRV 36 continuously adjusts the opening degree of the EGR valve 32 (i.e., EGR valve opening degree). The VSV 35 includes an input port, through which atmospheric pressure is drawn. The EGR valve 32 is fully closed when the VSV 35 is switched to a position where the VSV 35 draws in ambient air. The EGR valve 32 is a lift-type valve having a reciprocative valve body that determines the EGR valve opening degree in accordance with the lift amount of the valve body.

Various types of devices are provided for the engine 1 and the fuel injection pump 2 to detect the load applied to the engine 1 and the operating state of the engine 1. More specifically, a crank angle sensor 41, which detects the rotational angle, or crank angle, of the crankshaft 16, and a coolant temperature sensor 42, which detects the temperature Tw of the coolant flowing through the engine 1, are arranged in the cylinder block 11.

An air cleaner 43 is arranged at the inlet of the intake passage 17. An air flow meter 44, which detects the flow rate of the intake air, and an atmospheric temperature sensor 45, which detects the temperature of the atmosphere, are located downstream to the air cleaner 43 in the intake passage 17.

An intercooler 46 and an intake heater 47 are arranged downstream to the compressor 22 in the intake passage 17. The intercooler 46 functions as a heat exchanger (cooling device) for the air supercharged by the turbine 21. That is, the intercooler 46 cools the heated air compressed by the turbine 21 to increase the density of the air. The intake heater 47 heats the intake air, for example, during the wintertime when the atmospheric temperature is low. A throttle valve 48 is arranged in the intake passage 17 at a location that is downstream to the intercooler 46 and upstream to the intake heater 47. The throttle valve 48 is driven by a throttle motor 49. A pedal depression sensor 51 detects the depressed amount of an acceleration pedal 50. In accordance with the detected depressed amount, the throttle motor 49 adjusts the opening degree of the throttle valve 48, or the throttle opening degree, to adjust the amount of the air draw into the combustion chamber 13. The throttle motor 49 incorporates a fully open switch (not shown), which detects whether the throttle valve 48 is in a position where it is fully opened. When the throttle valve 48 is fully opened, the fully open switch outputs a fully opened detection signal. A pedal switch 52 is arranged in the vicinity of the acceleration pedal 50 to detect that the acceleration pedal 50 is not being depressed, that is, to detect that the depressed amount of the acceleration pedal 50 is null.

An intake temperature sensor 53 is arranged downstream to the intake heater 47 in the intake passage 17 to detect the temperature of the intake air. An output port of a vacuum switching valve (VSV) 54 is connected to the intake passage 17 near the intake temperature sensor 53. An intake pressure sensor 55 detects the pressure at the output port of the VSV 54. In accordance with the switching of the VSV 54, the intake pressure sensor 55 detects the pressure at the output port of the VSV 54 as the intake pressure (i.e., supercharged pressure Pb) or detects the atmospheric pressure Pa.

The intake port connected to each combustion chamber 13 is bifurcated into a helical port and a tangential port. A swirl control valve (SCV) is arranged in the tangential port. A vacuum switching valve (VSV) 57 applies negative pressure to the SCV 56 to open and close the SCV 56. For example, the SCV 56 closes the tangential port if the engine 1 is being operated in a low load state, such as when the vehicle is being driven at a low speed. This increases the flow rate of the intake air flowing into the helical port and produces a strong swirl of air in each combustion chamber 13. As a result, the combustion efficiency of the air-fuel mixture increases. If the engine 1 is being operated in a high load state, such as when the depressed amount of the acceleration pedal 50 is large, the SCV 56 opens the tangential port. This increases the amount of intake air sent supplied to each combustion chamber 13 and produces high power with the engine 1.

The fuel injection pump 2, which is driven by the crankshaft 16, is provided with an electromagnetic spill valve 60, which adjusts the amount of injected fuel, and a time control valve (TCV) 61, which controls the fuel injection time. The amount of fuel injected from each fuel injection nozzle 14 is adjusted by controlling the time during which the electromagnetic spill valve 60 is excited to adjust the spilled fuel amount of the fuel injection nozzle 14. Further, the fuel injection time is determined by duty-controlling the TCV 61 to adjust the timing for starting the movement of a plunger, which reciprocates in a housing of the fuel injection pump 2. The fuel injection pump 2 is also provided with an engine speed sensor 62, which detects the engine speed NE, and a fuel temperature sensor 63, which detects the temperature of the fuel in the pump 2. A common rail type fuel injection system may be employed.

An exhaust gas purifying device (oxidation catalyst) 65 and a diesel particulate filter (not shown) are arranged in the exhaust passage 18 downstream to the turbine 21. The exhaust gas purifying device 65 oxidizes the non-combusted gases included in the exhaust gas to purify the exhaust gas.

The detection devices 41, 42, 44, 45, 51, 52, 53, 55, 62, and 63 are connected to an input interface of the ECU 3 and send detection signals to the ECU 3. Actuators including the EVRVs 25 and 36, the VSVs 35, 54, and 57, the throttle motor 49, the electromagnetic spill valve 60, and the TCV 61 are connected to an output interface of the ECU 3. The ECU 3 optimally controls the actuators connected to the output interface based on the detection signals from the detection devices connected to the input interface.

The ECU 3 is a controller including a microcomputer 70 and a memory (e.g., ROM and RAM) 71. The microcomputer 70 recognizes the operating state of the engine 1 from the detection signals of the detection devices. Further, the microcomputer 70 refers to various types of data, such as maps stored in the memory 71, to determine various types of command values (control values) that are required for controlling the engine 1 in accordance with the operating state of the engine 1.

In the first embodiment, the opening degree of the EGR valve 32 is feedback controlled. The memory 71 stores a program for feedback controlling the EGR valve opening degree. In the first embodiment, PID control is employed as the feedback control. More specifically, the ECU 3 obtains a fuel injection amount Qv in accordance with the engine operating state, which includes the engine speed NE and the throttle opening degree. The required intake air amount Qv is generally correlated with the fuel injection amount Qv. The ECU 3 also obtains a target EGR rate (%) within a range in which the required air-fuel ratio may be guaranteed. The target EGR rate is obtained from the formula of (EGR amount/(EGR amount+intake air amount GA)). To achieve the target EGR rate, the ECU 3 calculates a target EGR valve-opening degree (%) based on a formula that takes into consideration various factors. More specifically, the ECU 3 calculates the EGR valve opening degree that achieves the target EGR rate based on the intake air amount GA, which is detected by the air flow meter 44, with a feedback formula (PID control formula). The target EGR valve opening degree that achieves the required EGR rate when the difference between the pressures at the upstream side and downstream side of the EGR valve 32 is normal is obtained through the feedback formula. In other words, the feedback formula is set under the assumption that the difference between the pressures at the upstream side and downstream side of the EGR valve 32 (the difference between the exhaust pressure Pex and the intake pressure Psc) is in a normal state.

Figure 2:
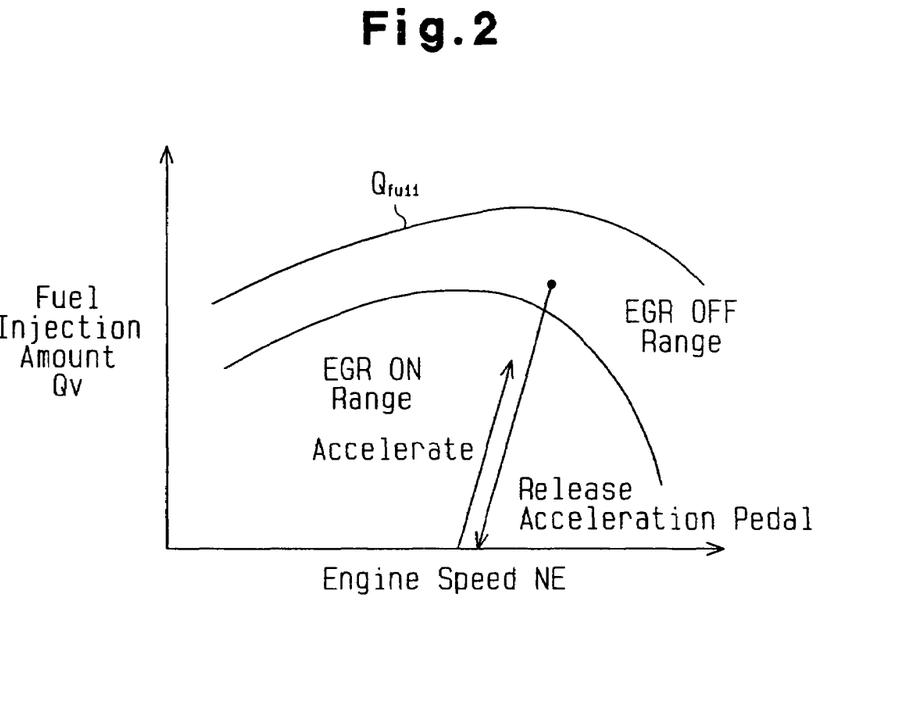
FIG. 2 is a map that is referred to when determining whether or not to perform EGR.

FIG. 2 is an EGR determination map that is referred to when determining whether or not to perform EGR. The ECU 3 determines whether the present engine operating state is in an operating range that requires EGR (EGR ON range) or in an operating range that does not require EGR (EGR OFF range) based on the engine speed NE and the fuel injection amount Qv by referring to the EGR determination map. In FIG. 2, the vicinity of a line representing the maximum fuel injection amount Qfull corresponds to a high load operation range of the engine 1. The high load operation range is set in the EGR OFF range. A median/low load operating range of the engine 1 is set in the EGR ON range. The operating range in which the fuel injection amount Qv is substantially null is set in the EGR OFF range. In other words, since high power is produced when the engine 1 is being operated in a high load state, EGR is not performed. EGR is performed when the engine 1 is in the median/low range operating state to decrease the combustion temperature and reduce NOx. When fuel is not injected, NOx is not produced. Thus, EGR is not performed. The map of FIG. 2 is just one condition for determining whether or not to perform EGR. Thus, other conditions may be taken into consideration to comprehensively determine whether or not to perform EGR.

As mentioned in the BACKGROUND OF THE INVENTION section, if the acceleration pedal 50 is temporarily released from a depressed state when the engine 1 is operating at a high speed and, immediately afterward, depressed to increase the speed of the engine 1 (refer to the arrows in FIG. 2), the difference between the exhaust pressure of the exhaust passage 18 and the intake pressure of the intake passage 17 temporaily become too large. If the EGR valve 32 is opened in this state, the EGR amount tends to become excessive. More specifically, if the acceleration pedal 50 is temporarily released from a depressed state when the engine 1 is operating at a high speed, the injection of fuel from the fuel injection nozzles 14 is stopped and the EGR valve 32 is closed to stop performing EGR. However, the variable vanes 23 of the turbine 21 are driven so that the opening degree increases as the depressed amount of the acceleration pedal 50 decreases. However the operation of the variable vanes 23, which are driven through feedback control, is delayed from the operation of the fuel injection nozzles 14, which are controlled in accordance with the depressed amount of the acceleration pedal 50, and the operation of the EGR valve 32, which is controlled in accordance with the fuel injection amount. Thus, during the short period from when the depressed pedal 50 is released, the fuel injection is stopped and the EGR valve 32 is closed but the variable vanes 23 virtually do not move in the opening direction. When the EGR valve 32 is closed, all of the exhaust gas flows through the turbine 21. However, since the variable vanes 23 do not move in the opening direction, the backpressure of the turbine 21 increases and the exhaust pressure of the acceleration pedal 50 increases. In the intake passage 17, immediately after the depressed acceleration pedal 50 is released, the throttle valve 48 moves in the closing direction in a state in which the engine 1 is still running at a high speed due to inertia. This decreases the intake pressure of the intake passage 17.

If the depressed acceleration pedal 50 is released and, within a short period of time, the acceleration pedal 50 is depressed again, the opening degree of the variable vanes 23 remains relatively small until the intake pressure of the intake passage 17, that is, the air supply pressure, reaches its target value. As the rotating speed of the turbine 21 increases, the intake pressure reaches its target value. Then, the variable vanes 23 move in the opening direction. However, due to the inertia of the turbine 21, a certain amount of time is necessary for the rotating speed of the turbine 21 to increase. Thus, even if the acceleration pedal 50 is depressed again, the variable vanes 23 do not immediately move in the opening direction, and the intake pressure of the intake passage 17 does not immediately increase. However, fuel injection is restarted when the acceleration pedal 50 is depressed again. Thus, the exhaust pressure of the exhaust passage 18 increases immediately. Therefore, when the acceleration pedal 50 is operated as described above, the difference between the exhaust pressure in the exhaust passage 18 and the intake pressure in the intake passage 17 temporarily becomes excessive in comparison to when the difference is in a normal state.

In this manner, in a state in which the difference between the exhaust pressure of the exhaust passage 18 and the intake pressure of the intake passage 17 is excessive, if the depression of the acceleration pedal 50 starts EGR and the EGR valve 32 instantaneously moves to its target opening degree, an excessive amount of the exhaust gas is returned to the intake passage 17. The EGR amount is determined by the EGR valve opening degree and the difference between the exhaust pressure and the intake pressure. Thus, even if the EGR valve opening degree is appropriate, an excessive difference between the exhaust pressure and the intake pressure may result in an excessive EGR amount that would lead to the production of fumes. Accordingly, in the first embodiment, to prevent the production of fumes when the acceleration pedal 50 is operated in a special manner, EGR primary control is performed when the EGR valve 32 is opened from a fully closed state.

Figure 3:
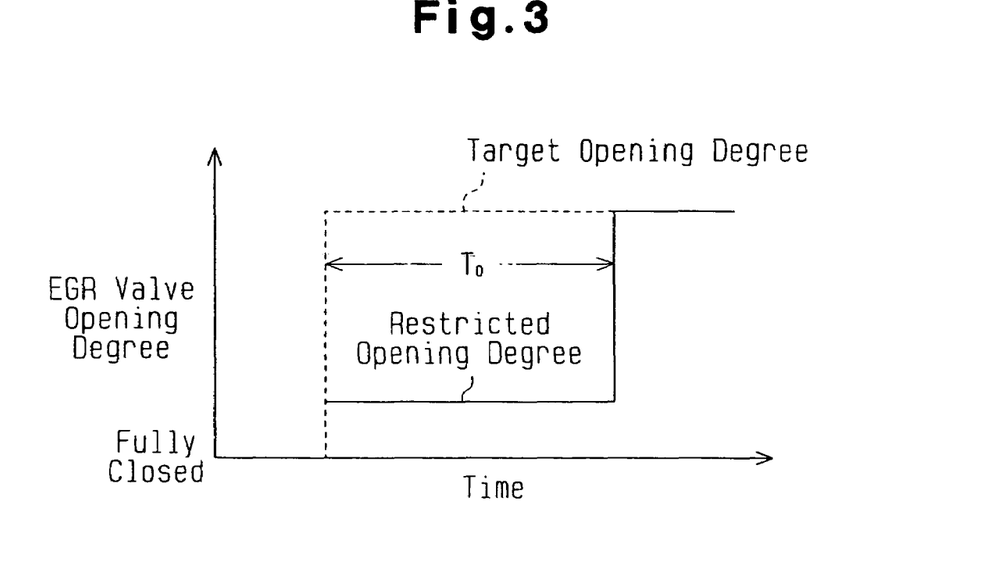
FIG. 3 is a graph illustrating the EGR return control.

FIG. 3 is a graph illustrating the EGR primary control. When starting EGR from a state in which EGR is not being performed, EGR primary control is performed to delay the timing at which the EGR valve 32 reaches its target opening degree by a predetermined time To from when EGR is started so that the EGR valve 32 does not immediately reach its target opening degree. The predetermined time (delay time) To is determined taking into consideration the time required for the difference between the exhaust pressure and the intake pressure to be converged to the normal value when the acceleration pedal 50 is operated in a special manner as described above.

In the first embodiment, the delay time To is set to a value between 200 to 1,000 milliseconds, for example 500 milliseconds. The delay time To is determined in accordance with the design concept of the engine 1. The delay time To is determined, for example, so that fumes are not produced under harsh operating conditions for the engine 1. Although the delay time To may exceed one second, it is preferred that the delay time To be one second or less.

During the delay time To, the opening degree of the EGR valve 32 is maintained at a predetermined restricted opening degree, which is smaller than the target opening degree. In the first embodiment, the restricted opening degree is a fixed value. Depending on the engine speed NE, fluctuation of the negative pressure applied to the EGR valve 32, which is driven by negative pressure, or fluctuation of the difference between the pressures at the upstream side and downstream side of the EGR valve 32 causes chattering of the EGR valve 32 in an opening degree range that is smaller than a predetermined chattering threshold opening degree. In the first embodiment, to avoid such chattering, an opening degree that is slightly greater than the chattering threshold opening degree, that is, the vicinity of the minimum value of the opening degree range in which the valve opening degree may be stably maintained, is set as the restricted opening degree. More specifically, the restricted opening degree is a value that is about 10 to 20% of the maximum opening degree of the EGR valve 32. However, the restricted opening degree is not restricted to a value in the vicinity of the chattering threshold opening degree as long as it prevents fumes from being produced and is smaller than the target opening degree.

The restricted opening degree may be a variable value that is determined in accordance with the operating state of the engine 1. For example, a certain percentage (%) of the target EGR valve opening degree, which is determined in accordance with the engine operating state, may be set as the restricted opening degree value. Alternatively, the restricted opening degree may be set in accordance with the maximum value of the engine load during a predetermined time (e.g., 0.5 to 2 seconds) before EGR is started. The EGR rate during EGR primary control may be equalized with the value of the difference between the exhaust pressure and the intake pressure in a normal state by determining the restricted opening degree in accordance with a parameter indicating the engine operating state (e.g., intake air amount).

In the same manner, the delay time To may be a variable value that is determined in accordance with the engine operating state. By determining the delay time To in accordance with a parameter indicating the engine operating state (e.g., intake air amount), the termination of the EGR primary control is always enabled immediately after the difference between the exhaust pressure and the intake pressure is converged to the normal value. A plurality of parameters including the intake air amount or at least one parameter other than the intake air amount may be used as the parameter that indicates the engine operating state to determine the restricted opening degree and the delay time To.

When performing EGR valve primary control, the EGR valve is maintained in a state opened at the restricted opening degree and not in a closed state. This is due to two reasons. The first reason is in that EGR is performed during the delay time To at a level that does not produce fumes to maintain the NOx reduction effect. That is, in addition to delaying the timing for starting EGR, the EGR amount is controlled at an appropriate amount during the delay time To to reduce NOx and suppress the production of fumes. Another reason is in that if the EGR valve 32 is closed during the delay time To, it would take time for the difference between the exhaust pressure and the intake pressure to be converged to the normal value. By opening the EGR valve to the restricted opening degree, which is smaller than the target opening degree, exhaust gas flows into the intake passage 17, and the difference between the exhaust pressure and the intake pressure is quickly converged to the normal value.

When EGR primary control is being performed, feedback control is prohibited to avoid erroneous learning, and the EGR valve 32 is open loop controlled. As described above, the feedback control is performed based on the intake air amount detected by the air flow meter 44, that is, the amount of new air drawn into the intake passage 17 with the PID formula. However, during the EGR primary control, the new intake amount fluctuates since the EGR amount is not stable. Thus, a compensation clause, and especially, an integral clause, in the PID formula is erroneously learned. This causes hunting of the valve body in the EGR valve 32. Therefore, to avoid problems such as hunting when performing EGR primary control, the EGR valve 32 is open loop controlled.

Figure 4:
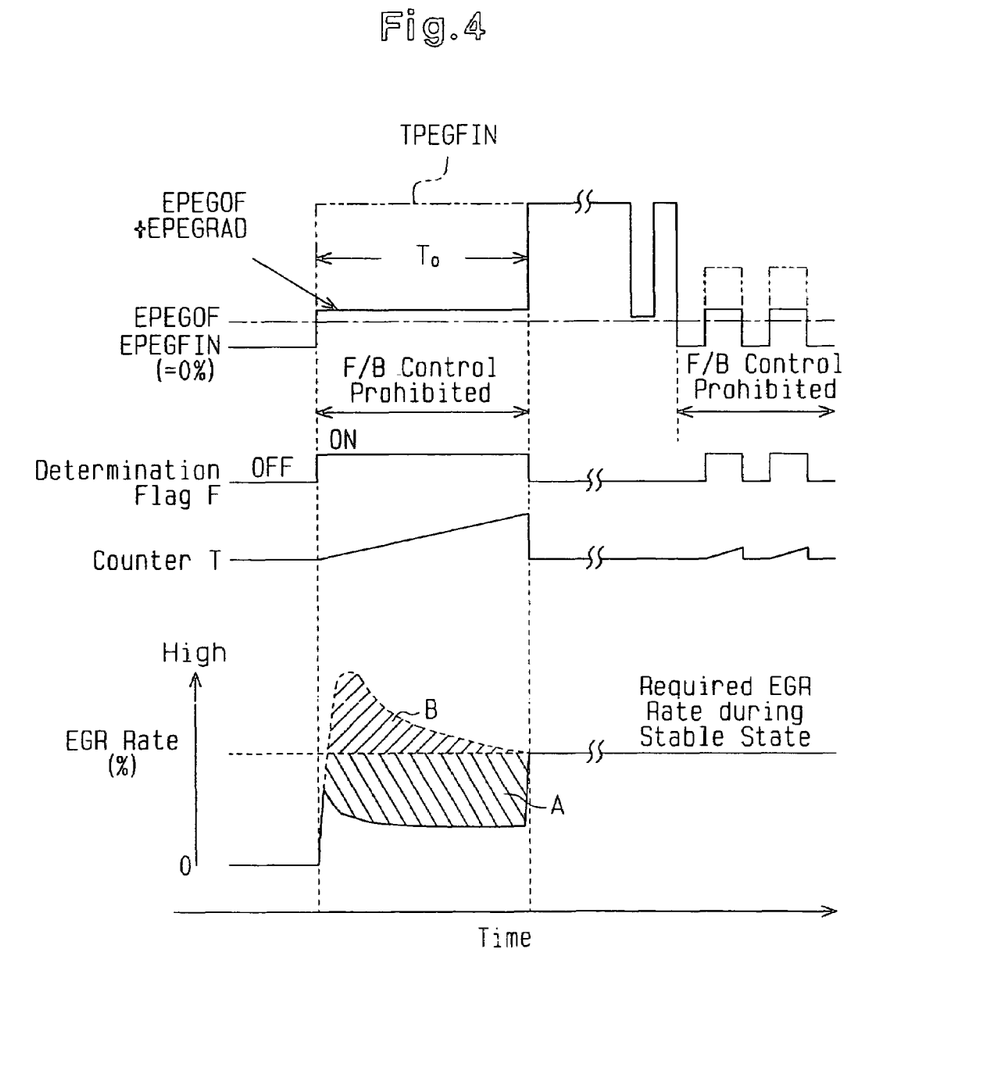
FIG. 4 is a timing chart illustrating the EGR return control.

FIG. 4 is a timing chart illustrating the EGR primary control. In FIG. 4, starting from the top row, the transitions of the EGR valve opening degree EPEGFIN, a determination flag F, a count value T of a time measuring counter, and the EGR rate (%) are shown.

The EGR valve opening degree EPEGFIN represents an opening command value of the EGR valve 32. In the chart illustrating the transition of the EGR valve opening degree EPEGFIN, the double-dotted broken line represents the target EGR valve opening degree TPEGFIN, which is used to feedback control the EGR valve 32. The single-dotted broken line represents the chattering threshold opening degree EPEGOF, or the minimum threshold value EPEGOF of the EGR valve opening degree range that avoids chattering. The EGR valve 32 is controlled so that its opening degree is smaller than the chattering threshold opening degree EPEGOF but greater than 0%. For example, when the obtained EGR valve opening degree EPEGFIN is smaller than the chattering threshold opening degree EPEGOF, the EGR valve opening degree EPRGFIN is set to 0%.

The chattering threshold opening degree EPEGOF has a hysteresis. That is, the chattering threshold opening degree EPEGOF actually has a first value and a second value, which is smaller than the first value. When the present EGR valve opening degree EPEGFIN is 0%, the chattering opening degree EPEGOF is used as the first value. Accordingly, when the EGR valve opening degree EPEGFIN increases from 0%, the EGR valve opening degree EPEGFIN changes suddenly from 0% to the first value or greater. If the present EGR valve opening degree EPEGFIN is greater than the chattering threshold opening degree EPEGOF, the chattering threshold opening degree EPEGOF is used as the second value. Accordingly, when the EGR valve opening degree EPEGFIN decreases, the EGR valve opening degree EPEGFIN changes suddenly from the second value to 0%.

The determination flag F is used to determine whether or not to perform EGR primary control. When the determination flag F switches from OFF to ON, the EGR primary control is started. When the determination flag F switches from ON to OFF, the EGR primary control is completed. When the EGR primary control is being performed, the EGR valve opening degree EPEGFIN is held at the restricted opening degree (EPEGOF+EPEGRAD) during the delay time To. The restricted opening degree is a value that is greater than the chattering threshold opening degree EPEGOF by the predetermined value EPEGRAD. Further, the delay time To is set at, for example 500 milliseconds as described above. The delay time To is measured based on the count value T of the time measuring counter.

When the EGR primary control is being performed, as shown by the hatched range A in FIG. 4, the actual EGR rate is always kept at a value that is less than or equal to the required EGR rate in a state in which the difference between the exhaust pressure and the intake pressure is normal. The predetermined value EPEGRAD, which is used to determine the restricted opening degree, is set so that the EGR rate is a value included in range A during EGR primary control. Thus, the production of fumes is prevented. When the EGR valve 32 is feedback controlled, a target opening degree is determined from the required EGR rate under the assumption that the difference between the exhaust gas and the intake gas is normal. Thus, when the EGR valve 32 is opened to the target opening degree in accordance with the feedback control, the excessive difference between the pressures at the upstream side (exhaust pressure) and downstream side (intake pressure) of the EGR valve causes the actual EGR rate to be included in hatched range B of FIG. 4. In other words, the actual EGR rate exceeds the EGR rate that is required when the difference between the exhaust pressure and the intake pressure is normal and causes the production of fumes.

Further, as shown in FIG. 4, when shifting from EGR primary control to EGR feedback control as the delay time To elapses, the EGR valve 32 is controlled so that the EGR valve opening degree EPEGFIN matches the target opening degree TPEGFIN for feedback control during the period the EGR valve opening degree EPEGFIN is not lower than the second value of the chattering threshold opening degree EPEGOF. EGR primary control, or open loop control, is performed when the EGR valve opening degree EPEGFIN exceeds the first value of the chattering threshold opening degree EPEGOF after reaching 0%, which is lower than the second value of the chattering threshold opening degree EPEGOF. Thus, the EGR valve opening degree EPEGFIN is held at the restricted opening degree, which is smaller than the target opening degree TPEGFIN for feedback control. When the EGR valve opening degree repeats fluctuation about the chattering threshold opening degree EPEGOF, hunting of the EGR valve 32 becomes relatively large (refer to the upper double-dotted line in FIG. 4) when performing feedback control. However, the hunting of the EGR valve 32 is suppressed by performing the EGR primary control (refer to the upper solid line in FIG. 4).

Figure 5:
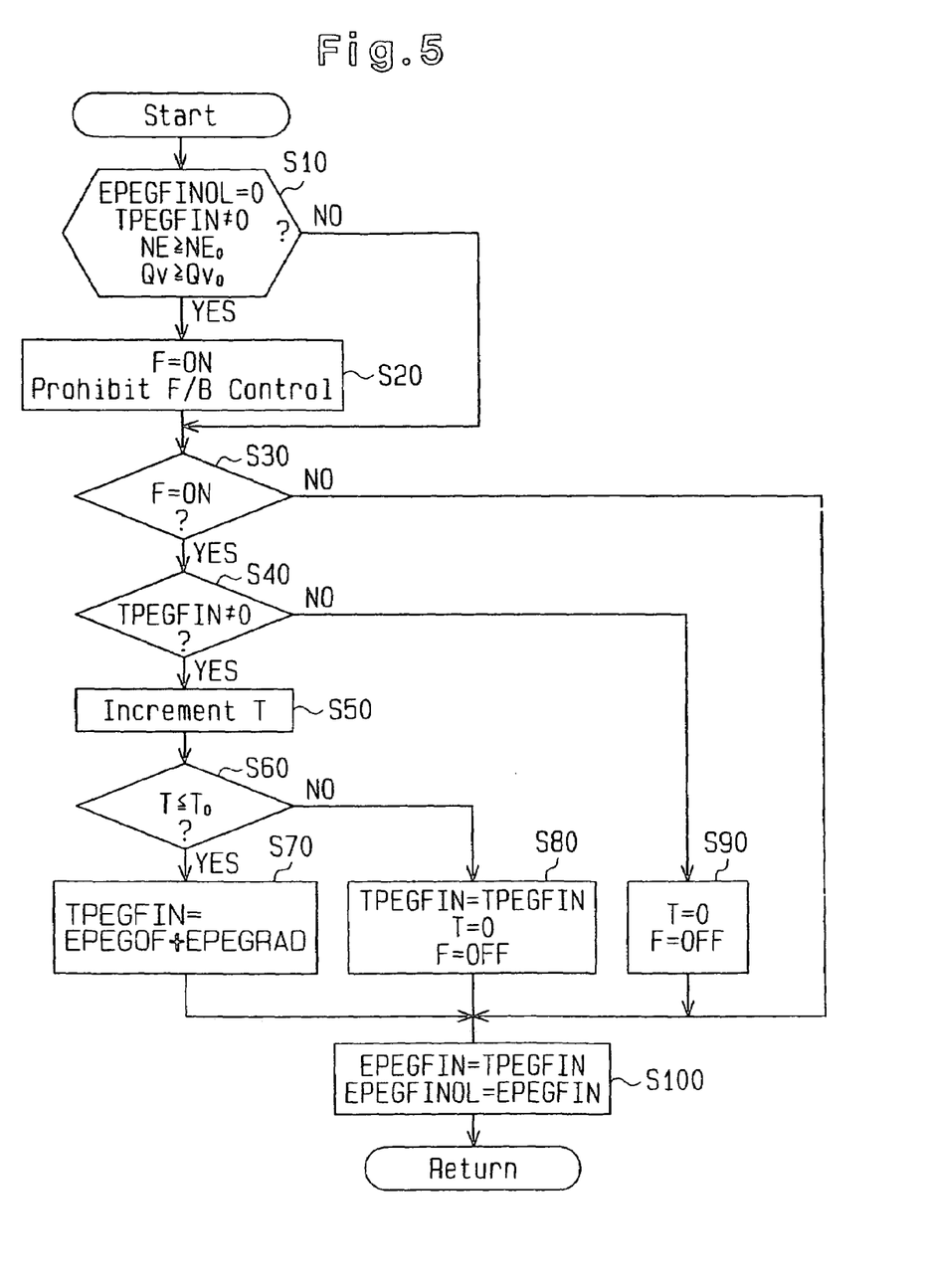
FIG. 5 is a flowchart illustrating the EGR return control.

FIG. 5 is a flowchart illustrating the procedures of the EGR primary control. When the engine 1 is being operated, the ECU 3 performs the procedures illustrated in FIG. 5 in predetermined time intervals (10 milliseconds) in accordance with a program stored in the memory 71.

In step S10, the ECU 3 determines whether the conditions for starting EGR primary control are satisfied. The ECU 3 determines that the conditions for starting EGR primary control are satisfied when all of the following conditions are satisfied. The final EGR valve opening degree EPEGFINOL, which was set when the routine was performed in the previous cycle, is 0%; the present target EGR valve opening degree TPEGFIN is greater than 0%; the engine speed NE is greater than or equal to a predetermined threshold value NEo; and the fuel injection amount Qv is greater than or equal to a predetermined threshold value Qvo. The final opening degree EPEGFINOL is the opening degree command value of the EGR valve 32 that was set when the routine was performed in the previous cycle. The present target opening degree TPEGFIN is obtained in another routine through the PID formula described above. The threshold value NEo of the engine speed NE is a value between, for example, 500 to 1,000 rpm. The conditions related with the engine speed NE and the fuel injection amount Qv may be eliminated from the conditions for starting the EGR primary control. Further, conditions other than those described above may be added to the EGR primary control starting conditions. The ECU 3 proceeds to step S20 when the EGR primary control starting conditions are satisfied and proceeds to step S30 when the conditions are not satisfied.

In step S20, the ECU 3 causes the determination flag F to go ON and prohibits feedback control. More specifically, in the PID formula, the ECU 3 sets the proportional clause to zero and prohibits updating of the integral clause to prohibit feedback control.

In step S30, the ECU 3 determines whether the determination flag F is ON. The ECU 3 proceeds to step S40 if the determination flag F is ON and proceeds to step S100 if the determination flag F is OFF.

In step S40, the ECU 3 determines whether the present target opening degree TPEGFIN, which is obtained through the PID formula, is not 0%. The ECU 3 proceeds to step S50 if the present target opening degree TPEGFIN is not 0% and proceeds to step S90 of the present target opening degree TPEGFIN is 0%.

In step S50, the ECU 3 increments the count value T of the time measuring counter. In step S60, the ECU 3 determines whether the count value T is less than or equal to the delay time To (e.g., 500 milliseconds). The ECU 3 proceeds to step S70 when the count value T is less than or equal to the delay time To and proceeds to step S80 when the count value T exceeds the delay time To.

In step S70, the ECU 3 newly sets the restricted opening degree (EPEGOF+EPEGRAD) and not the present target opening degree TPEGFIN, which is obtained through the PID formula, as the present target opening degree TPEGFIN. In step S100, the ECU 3 sets the present target opening degree TPEGFIN as the final opening degree EPEGFIN, that is, as the opening degree command value of the EGR valve 32. When shifting from step S70 to S100, the restricted opening degree (EPEGOF+EPEGRAD) is set as the final opening degree EPEGFIN. The ECU 3 also stores the final opening degree EPEGFIN as the previous final opening degree EPEGFINOL for the next cycle of the routine.

Therefore, when the EGR primary control starting conditions are satisfied (YES in step S10), feedback control is prohibited, and EGR primary control (open loop control) for maintaining the EGR valve opening degree at the restricted opening degree (EPEGOF+EPEGRAD) is performed (steps S20 to S70). The EGR primary control is continued during the period in which the counter value T of the time measuring counter reaches the delay time To. In step S60, when the count value T exceeds the delay time To, the ECU 3 proceeds to step S80.

In step S80, the ECU 3 sets the present target opening degree TPEGFIN, which is obtained through the PID formula, as the present target opening degree TPEGFIN. The ECU 3 also resets the counter value T of the time measuring counter to zero and sets the determination flag F to OFF. Afterward, the ECU 3 proceeds to step S100.

Accordingly, the EGR valve opening degree is maintained at the restricted opening degree (e.g., 20%) during the delay time To from when the EGR primary control is started. Then, the target opening degree is increased (e.g., to 60%) based on the PID formula, and feedback control is performed.

When performing EGR primary control, if the target opening degree To, which is based on the PID formula, becomes 0% (NO in step S40), the ECU 3 proceeds to step S90. In step S90, the ECU 3 resets the count value T of the time measuring counter to zero and sets the determination flag F to OFF. This completes the EGR primary control. In other words, after the EGR primary control is started, the EGR primary control is completed either when the target opening degree TPEGFIN, which is based on the PID formula, becomes 0% or when the delay time To elapses.

The ECU 3 controls the EVRV 36 or the VSV 35 in accordance with the final opening degree EPEGFIN that is set in step S100 to adjust the opening degree of the EGR valve 32.

The first embodiment has the advantages described below.

(1) When EGR is performed from a state in which the EGR valve 32 is closed, EGR primary control is first performed. During the EGR primary control, the EGR valve 32 is held at the restricted opening degree, which is smaller than the target opening degree based on the PID formula, during the delay time To. Then, the EGR valve 32 is actuated to achieve the target opening degree, which is based on the PID formula. Accordingly, even if EGR is started when the difference between the pressures of the upstream side and downstream side of the EGR valve 32 is excessive, exhaust gas is prevented from being excessively returned to the intake passage 17, and the discharge of fumes from the exhaust passage 18 is suppressed. The EGR primary control of the first embodiment is especially effective for suppressing the discharge of fumes.

(2) During the delay time To in EGR valve primary control, the EGR valve 32 is not maintained in a closed state but opened at the restricted opening degree. Thus, during EGR primary control, exhaust gas is returned to the intake passage 17 to reduce NOx. In addition, the difference between the exhaust pressure and the intake pressure is quickly converged to the normal value. This minimizes the delay time and enables quick shifting to normal feedback control from EGR valve primary control.

(3) In the first embodiment, the restricted opening degree and the delay time To are fixed values that do not affect the engine operating state. Thus, the restricted opening degree and the delay time To do not have to be calculated. This decreases the load applied to the ECU 3 during EGR valve primary control.

(4) When EGR primary control is being performed, feedback control is prohibited, and the EGR valve 32 is open loop controlled. This avoids the occurrence of hunting in the EGR valve 32 that would be caused by instability of the EGR amount.

(5) The restricted opening degree of the EGR valve 32 is set at a value that would avoid chattering. Thus, when EGR primary control is performed, the opening degree of the EGR valve 32 does not become lower than the chattering threshold opening degree, and chattering does not occur.

A second embodiment according to the present invention will now be discussed with reference to FIGS. 6 and 7 centering on the points differing from the first embodiment.

Figure 6:
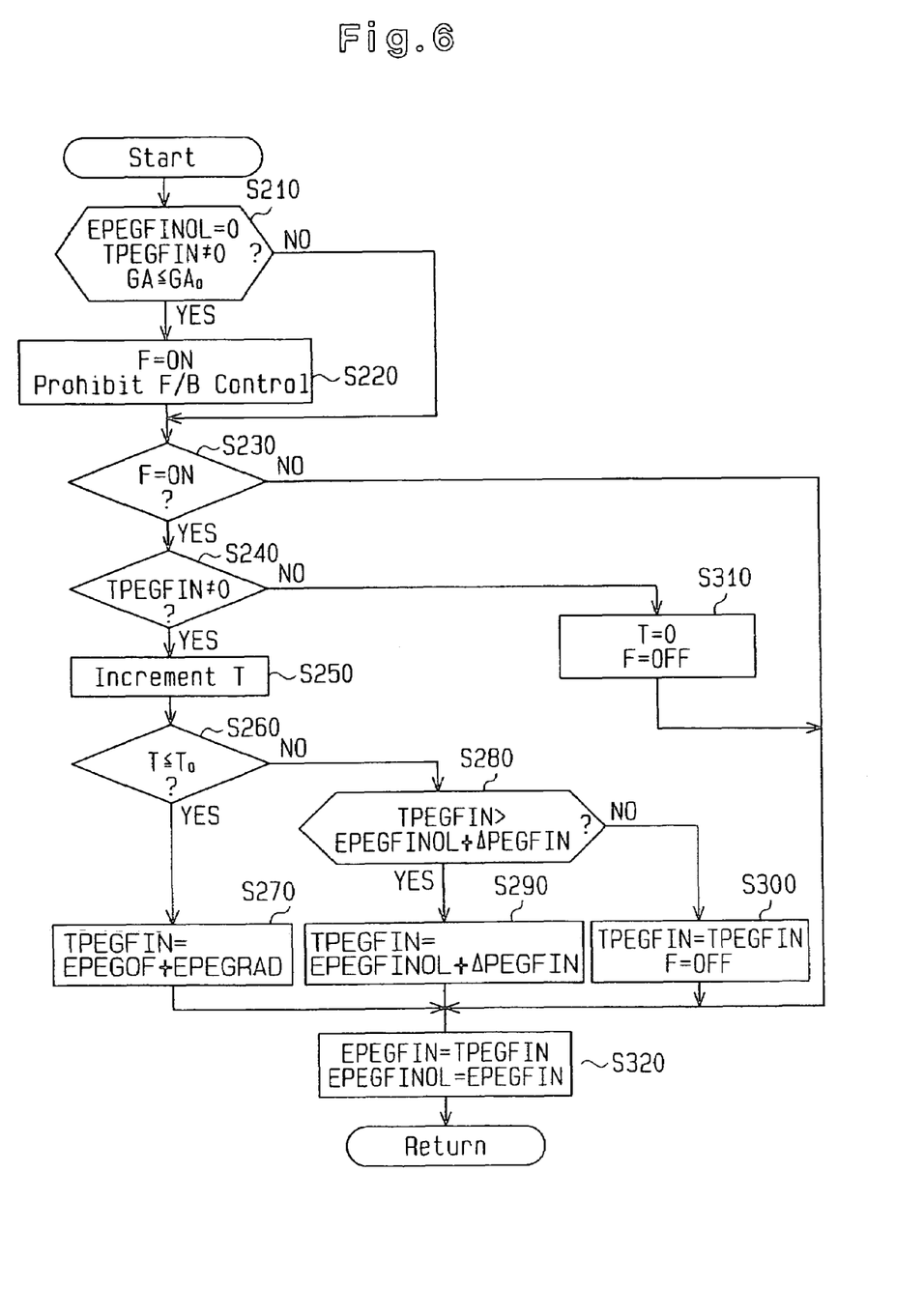
FIG. 6 is a flowchart illustrating the EGR return control according to a second embodiment of the present invention.

FIG. 6 is a flowchart illustrating the procedures of EGR primary control in the second embodiment. In step S210, the ECU 3 determines whether the conditions for starting EGR primary control are satisfied. The ECU 3 determines that the conditions for starting EGR primary control are satisfied when all of the following conditions are satisfied. The final EGR valve opening degree EPEGFINOL, which was set when the routine was performed in the previous cycle, is 0%; the present target EGR valve opening degree TPEGFIN is greater than 0%; and the actual intake air amount GA is less than or equal to a predetermined threshold value GAo. In other words, step S210 differs from step S10 of FIG. 5 in that the conditions related with the engine speed NE and the fuel injection amount Qv are eliminated and in that the condition of the actual intake air amount GA is added instead.

The actual intake air amount GA is detected by the air flow meter 44 (refer to FIG. 1). The appropriate EGR rate cannot be guaranteed when the actual intake air amount GA is small. The threshold value GAo of the actual intake air amount GA corresponds to the minimum value of the actual intake air mount that guarantees the appropriate EGR rate. Accordingly, in step S210, the actual intake air amount GA being less than or equal to the predetermined threshold value and thus not being able to guarantee the appropriate EGR rate is employed as one of the EGR primary control starting conditions.

The ECU 3 proceeds to step S220 when the EGR primary control starting conditions are satisfied in step S210 and proceeds to step S230 when the conditions are not satisfied.

The processing performed in steps S220, S230, S240, S250, S260, S270, and S320 respectively correspond to the processing performed in steps S20, S30, S40, S50, S60, S70, and S100. Thus, these steps will not be described.

Thus, when the EGR primary control starting conditions are satisfied (YES in step S210), the EGR primary-control (open loop control) for maintaining the EGR valve opening degree at the restricted opening degree (EPEGOF+EPEGRAD) is performed during the delay time To. In step S260, when the count value T exceeds the delay time To, the ECU 3 proceeds to step S280.

The processing performed in steps S280 to S300 differs from the processing performed in the routine of FIG. 5. In steps S280 to S300, as shown in FIG. 7, a process for gradually increasing the EGR valve opening degree from the restricted opening degree to the target opening degree, which is based on the PID formula, is performed. That is, a grading process of the EGR valve opening degree is performed. More specifically, in step S280, the ECU 3 determines whether the present target opening degree TPEGFIN, which is obtained through the PIG formula, is greater than a value obtained by adding a gradual increasing value ΔPEGFIN to the final opening degree EPEGFINOL of the previous cycle (EPEGFINOL+ΔPEGFIN). The gradual increasing value ΔPEGFIN is, for example 2%. When the determination of step S280 is YES, the ECU 3 proceeds to step S290.

In step S290, the ECU 3 renews the present target opening degree TPEGFIN with the value obtained by adding a gradual increasing value ΔPEGFIN to the final opening degree EPEGFINOL of the previous cycle (EPEGFINOL+ΔPEGFIN). In the same manner as in step S100 of FIG. 5, the ECU 3 sets the present target opening degree TPEGFIN (in this case, value (EPEGFINOL+ΔPEGFIN)) as the final opening degree (opening degree command) EPEGFIN and stores the final opening degree EPEGFIN as the final opening degree EPEGFINOL of the previous cycle.

Figure 7:
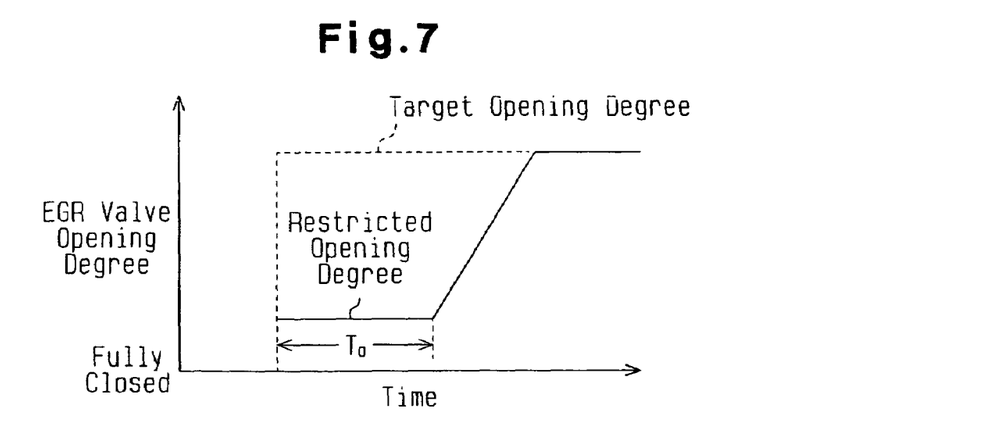
FIG. 7 is a graph illustrating the EGR return control.
Figure 8:
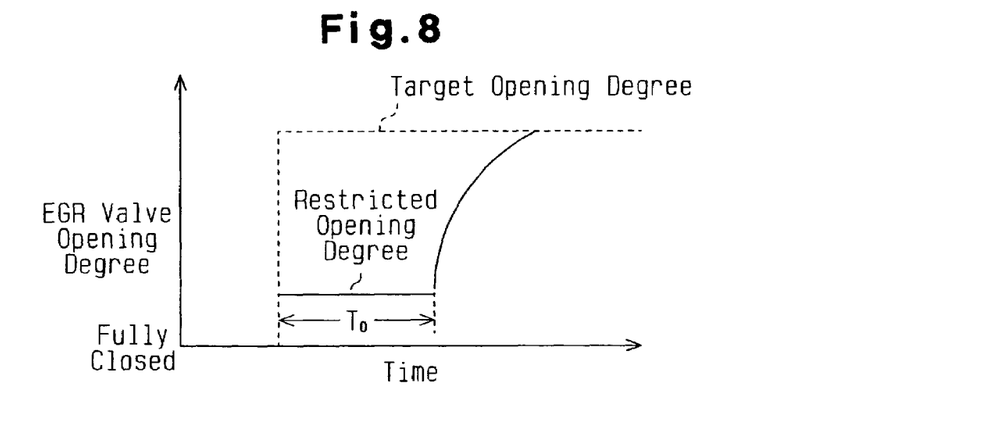
FIG. 8 is a graph illustrating EGR return control according to a third embodiment of the present invention.
Figure 9:
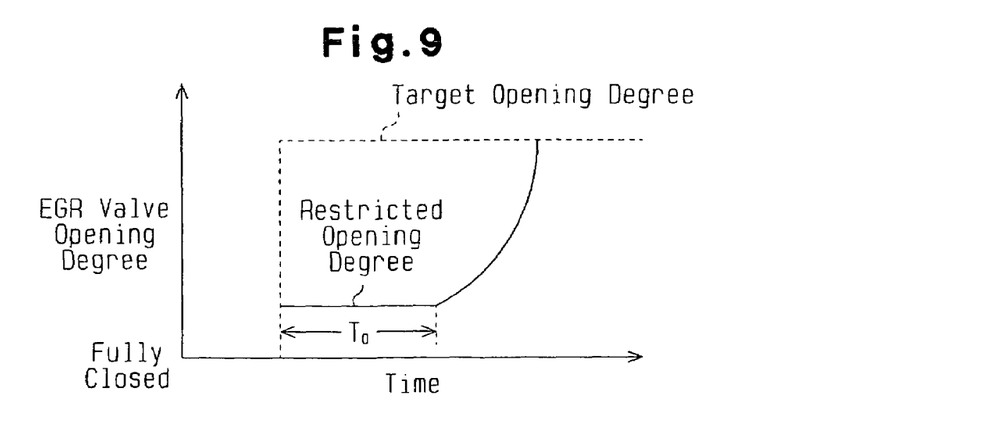
FIG. 9 is a graph illustrating EGR return control according to a fourth embodiment of the present invention.

Accordingly, whenever the routine of FIG. 6 is performed, the EGR valve opening degree is increased gradually by the gradual increasing value ΔPEGFIN (refer to FIG. 7).

When the determination of step S280 is NO, that is, when the present target opening degree TPEGFIN, which is obtained through the PID formula, is less than or equal to value (EPEGFINOL+ΔPEGFIN), the ECU 3 proceeds to step S300. In step S300, the ECU 3 sets the present target opening degree TPEGFIN, which is obtained through the PID formula, as the present target opening degree TPEGFIN and sets the determination flag F to OFF. In this manner, the EGR primary control is completed and normal feedback control is performed.

For example, it may be assumed that the restricted opening degree of the EGR valve 32 is 20%, the gradual increasing value ΔPEGFIN is 2%, the target opening degree TPEGFIN based on the PID formula is 60%, and the routine of FIG. 6 is repeated every 10 milliseconds. In such a case, the grading process of the EGR valve opening degree increases the EGR valve opening degree by 2% every ten milliseconds from the restricted opening degree of 20%. After about 200 milliseconds elapses from when the grading process starts, the target opening degree TPEGFIN, which is based on the PID formula, reaches 60%. This sets the determination flag F to OFF and the ECU 3 proceeds to feedback control from open loop control. In feedback control, the EGR valve is controlled to achieve the target opening degree TPEGFIN, which is based on the PID formula.

When the delay time To of the first embodiment illustrated in FIGS. 1 to 5 is 500 milliseconds, in the second embodiment, the delay time To is set at a time that is shorter than 500 milliseconds, for example, 300 milliseconds. That is, the delay time To in the second embodiment is set so that the time for entirely performed the EGR primary control, which includes the grading process, is about the same as the delay time To in the first embodiment. The EGR valve opening degree that is gradually increased during the grading process corresponds to the restricted opening degree, which is smaller than the target opening degree based on the PID formula, in the same manner as when the EGR valve opening degree is maintained at a constant value during the delay time To. Further, the period during which the grading process is performed corresponds to part of the delay time during which the EGR valve opening degree is restricted to an opening degree that is smaller than a target opening degree based on the PID formula.

Further, the delay time To and the restricted opening degree do not have to be fixed values and may be variable values that are determined in accordance with various parameters, such as those indicating the engine operating state, as described in the first embodiment, which is illustrated in FIGS. 1 to 5.

In addition to the advantages obtained in the first embodiment, which is illustrated in FIGS. 1 to 5, the second embodiment has the advantages described below.

The EGR valve opening degree is gradually increased from the restricted opening degree to the target opening degree, which is obtained through the PID formula. The shifting from EGR primary control to normal feedback control is performed smoothly without any overshooting of the EGR valve opening degree.

When determining whether or not to perform EGR primary control, the actual intake air amount GA is taken into consideration. The actual intake air amount GA being relatively small is employed as one of the EGR primary control starting conditions. In other words, when opening the EGR valve 32 to the target opening degree, which is obtained through the PID formula, in a state in which the difference between the intake pressure and the exhaust pressure is excessive and the actual intake air amount GA is relatively small, the possibility of the actual EGR rate exceeding the desired EGR rate is extremely high. Thus, EGR primary control is performed only when the actual intake air amount GA is small. As a result, the frequency for reducing the EGR amount in an unnecessary manner is minimized.

It should be apparent to those skilled in the art that the present invention may be embodied in many other specific forms without departing from the spirit or scope of the invention. Particularly, it should be understood that the present invention may be embodied in the following forms.

The EGR primary control does not have to be performed as described in the above embodiments and may be performed as described in the embodiments of FIGS. 8 to 14. In the same manner as in the second embodiment illustrated in FIGS. 6 and 7, in a third embodiment of the present invention illustrated in FIG. 8 and a fourth embodiment of the present invention illustrated in FIG. 9, after maintaining the EGR valve opening degree at the restricted opening degree during the delay time To, the EGR valve opening degree is gradually increased from the restricted opening degree to the target opening degree. However, in the embodiments of FIGS. 8 and 9, the EGR valve opening degree is increased from the restricted opening degree to the target opening degree in a curved manner. That is, in the third embodiment of FIG. 8, the EGR valve opening degree is increased so that the increasing amount of the valve opening degree per unit time gradually decreases as time elapses. In the fourth embodiment of FIG. 2, the EGR valve opening degree is increased so that the increasing amount of the valve opening degree per unit time gradually increases as time elapses.

Figure 10:
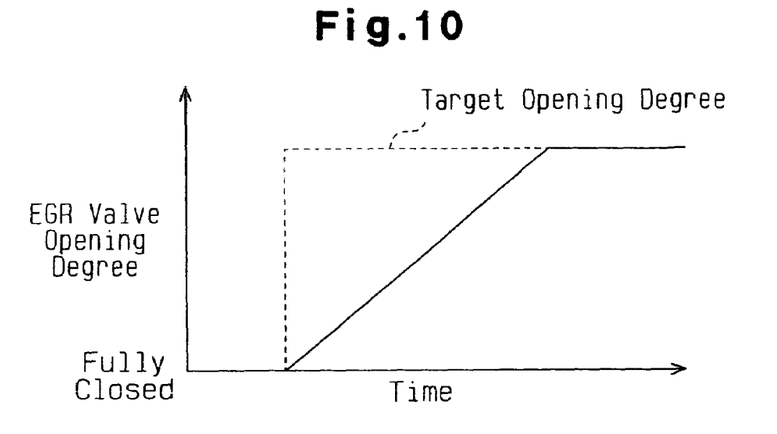
FIG. 10 is a graph illustrating EGR return control according to a fifth embodiment of the present invention.
Figure 11:
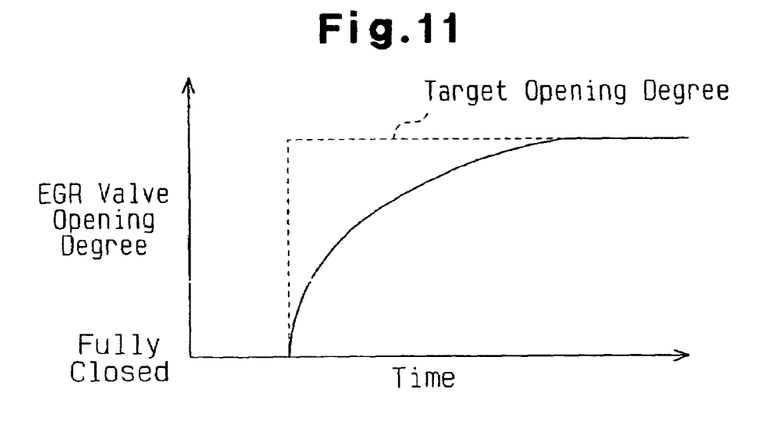
FIG. 11 is a graph illustrating EGR return control according to a sixth embodiment of the present invention.
Figure 12:
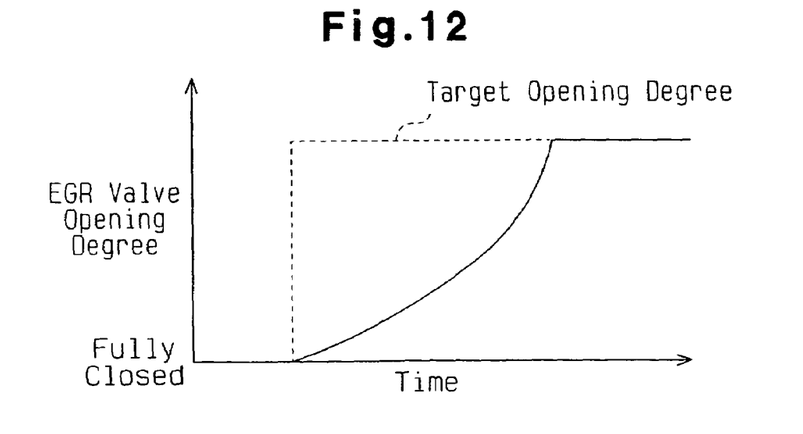
FIG. 12 is a graph illustrating EGR return control according to a seventh embodiment of the present invention.

FIGS. 10 to 12 each show an embodiment according to the present invention. In each of these embodiments, the EGR valve opening degree is gradually increased from 0% to the target opening degree throughout the entire period during which EGR primary control is performed. In a fifth embodiment illustrated in FIG. 10, the EGR valve opening degree is increased in a linear manner so that the increasing amount of the valve opening degree per unit time is constant. In this case, the EGR valve opening degree $Y_i$ is represented by $Y_{i-1}+A$ in which $Y_{i-1}$ is the EGR valve opening degree of the previous cycle and A is a predetermined constant.

In a sixth embodiment illustrated in FIG. 11, the EGR valve opening degree is increased in a curved manner so that the increasing amount of the valve opening degree per unit time decreases as time elapses. In this case, the EGR valve opening degree Y is represented by ΔEGR/A, in which ΔEGR is the deviation between the present EGR valve opening degree and the target EGR valve opening degree, and A is a predetermined constant.

In a seventh embodiment illustrated in FIG. 12, the EGR valve opening degree is increased in a curved manner so that the increasing amount of the valve opening degree per unit time increases as time elapses. In this case, the EGR valve opening degree Y is represented by ΔEGR/A, in which ΔEGR is the deviation between the present EGR valve opening degree and the target EGR valve opening degree, and A is a predetermined constant.

Figure 13:
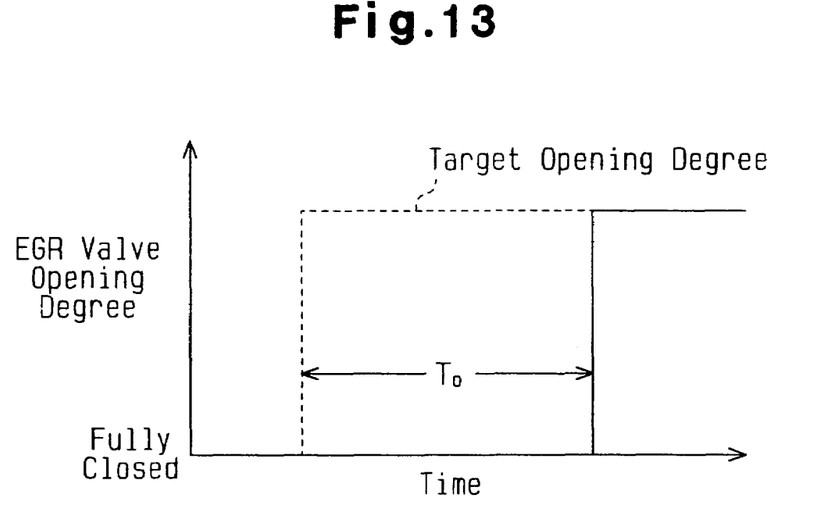
FIG. 13 is a graph illustrating EGR return control according to an eighth embodiment of the present invention.

In an eighth embodiment illustrated in FIG. 13, the EGR valve opening degree is held at 0% (entirely closed state) during the delay time To. That is, in the eighth embodiment, the timing for starting EGR, which is in accordance with feedback control, is delayed by the delay time To. This corresponds to a state in which the restricted opening degree is set to 0%.

Figure 14:
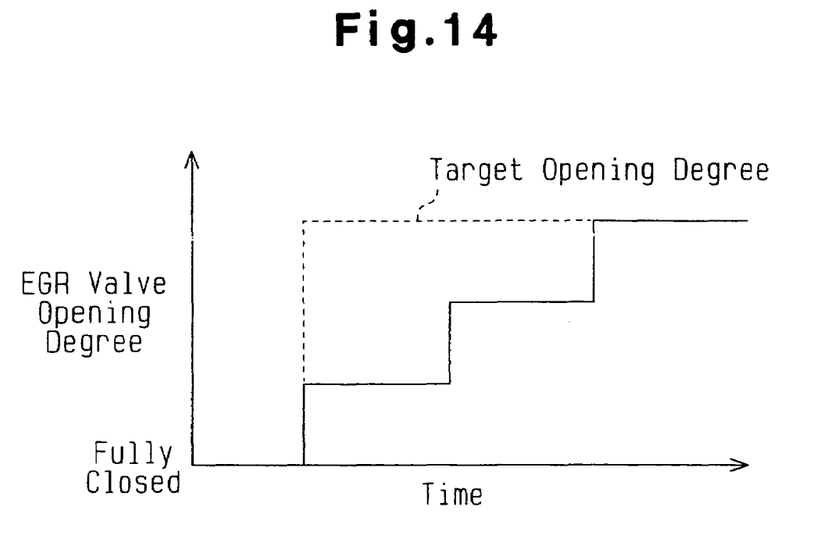
FIG. 14 is a graph illustrating EGR return control according to a ninth embodiment of the present invention.

In a ninth embodiment of FIG. 14, during EGR primary control, the EGR valve opening degree is gradually increased.

To perform EGR primary control, the EGR primary controls of the above embodiments may be combined together. For example, the control of the second embodiment illustrated in FIG. 11 may be performed in the former half of the EGR primary control, and the control of the embodiment illustrated in FIG. 11 may be performed in the latter half of the EGR primary control. Alternatively, the EGR valve opening degree may be increased in a linear manner in one of the former half and latter half of the EGR primary control and increased in a curved manner in the other one of the former half and latter half. Further, when the EGR valve opening degree is gradually being increased, the EGR valve opening degree may temporarily be held at a certain opening degree. In addition, when the EGR primary control is being performed, a process for decreasing the EGR valve opening degree may be performed. In this manner, during EGR primary control, the EGR valve opening degree may be controlled in any manner as long as it is smaller than the target opening degree.

The present invention is not limited to a diesel engine incorporating a variable geometry turbocharger and may be applied to a diesel engine that incorporates a supercharger, which is not a variable geometry turbocharger, or a diesel engine that does not have a supercharger. The present invention may be applied to an engine other than a diesel engine, such as a gasoline engine, as long as the engine incorporates an EGR device. In other words, regardless of the type of the engine, the EGR primary control of the present invention may be employed to suppress the production of fumes as long as there is a possibility of the difference between the pressures at the upstream side and downstream side of the EGR valve becoming excessive when EGR is started.

The EGR valve does not have to be driven by negative pressure and may be driven in any way. For example, an EGR valve that uses an electric motor as an actuator may be employed. If the EGR valve is motor-driven, chattering, which may occur when employing negative pressure to drive the EGR valve, does not occur. This widens the range in which the restricted opening degree of the EGR valve is set to further cover a lower range than when using negative pressure to drive the EGR valve. Thus, primary control is performed in a further optimal and accurate manner.

The present examples and embodiments are to be considered as illustrative and not restrictive, and the invention is not to be limited to the details given herein, but may be modified within the scope and equivalence of the appended claims.

What is claimed is:

1. An apparatus for controlling recirculation of exhaust gas from an exhaust passage of an engine to an intake passage of the engine, the apparatus comprising:
a recirculation passage connecting the exhaust passage to the intake passage;
an EGR valve arranged in the recirculation passage, wherein the EGR valve varies its opening degree to adjust the amount of exhaust gas recirculated from the exhaust passage to the intake passage; and
a controller for controlling the EGR valve, wherein the controller obtains a target opening degree of the EGR valve in accordance with an operating state of the engine and controls the EGR valve so that the opening degree of the EGR valve becomes equal to the obtained target opening degree, and, when opening the EGR valve from a fully closed state, the controller performs EGR primary control to restrict the opening degree of the EGR valve to a restricted opening degree that is smaller than the target opening degree during a predetermined delay time before actuating the EGR valve to the target opening degree so that the time when the opening degree of the EGR valve reaches the target opening degree is delayed compared to when the EGR valve is actuated from a state other than the fully closed state.

2. The apparatus according to claim 1, wherein the EGR valve is driven by negative pressure, and the restricted opening degree is set to a value included in an opening degree range in which chattering of the EGR valve does not occur.

3. The apparatus according to claim 1, wherein the restricted opening degree is a constant value.

4. The apparatus according to claim 1, wherein the controller gradually varies the restricted opening degree during at least part of the delay time.

5. The apparatus according to claim 1, wherein the delay time is the time required for eliminating an excessive difference between an exhaust pressure of the exhaust passage and an intake pressure of the intake passage.

6. The apparatus according to claim 1, wherein the delay time is a constant value.

7. The apparatus according to claim 1, wherein the controller feedback controls the EGR valve so that the opening degree of the EGR valve becomes equal to the target opening degree, and the controller prohibits the feedback controller when the EGR primary control is being performed.

8. The apparatus according to claim 1, wherein the engine includes a supercharger driven by exhaust gas flowing through the exhaust passage to supercharge air in the intake passage.

9. The apparatus according to claim 8, wherein the supercharger is a variable geometry turbocharger.

10. The apparatus according to claim 1, wherein the EGR primary control includes processing for maintaining the restricted opening degree at a constant value and processing for gradually increasing the restricted opening degree.

11. The apparatus according to claim 10, wherein the controller maintains the restricted opening degree at the constant value during a former part of the EGR primary control and gradually increases the restricted opening degree to the target value during a latter part of the EGR primary control.

12. The apparatus according to claim 1, wherein the restricted opening degree is a variable value.

13. The apparatus according to claim 12, wherein the controller sets the restricted opening degree in accordance with a parameter indicating the operating state of the engine.

14. The apparatus according to claim 1, wherein the delay time is a variable value.

15. The apparatus according to claim 14, wherein the controller sets the delay time in accordance with a parameter indicating the operating state of the engine.

16. An apparatus for controlling recirculation of exhaust gas from an exhaust passage of an engine to an intake passage of the engine, the apparatus comprising:
a recirculation passage connecting the exhaust passage to the intake passage;
an EGR valve arranged in the recirculation passage, wherein the EGR valve varies its opening degree to adjust the amount of exhaust gas recirculated from the exhaust passage to the intake passage; and
a controller for controlling the EGR valve, wherein the controller obtains a target opening degree of the EGR valve in accordance with an operating state of the engine and controls the EGR valve so that the opening degree of the EGR valve becomes equal to the obtained target opening degree, and, when opening the EGR valve from a fully closed state, the controller actuates the EGR valve to the target opening degree after a delay in time that is required for eliminating an excessive difference between an exhaust pressure of the exhaust passage and an intake pressure of the intake passage.

17. An apparatus for controlling recirculation of exhaust gas from an exhaust passage of an engine to an intake passage of the engine, the apparatus comprising:
a recirculation passage connecting the exhaust passage to the intake passage;
an EGR valve arranged in the recirculation passage, wherein the EGR valve varies its opening degree to adjust the amount of exhaust gas recirculated from the exhaust passage to the intake passage; and
a controller for controlling the EGR valve, wherein the controller obtains a target opening degree of the EGR valve in accordance with an operating state of the engine and controls the EGR valve so that the opening degree of the EGR valve becomes equal to the obtained target opening degree, and, when opening the EGR valve from a fully closed state, the controller performs EGR primary control to restrict the opening degree of the EGR valve to a restricted opening degree that is smaller than the target opening degree during a predetermined delay time before actuating the EGR valve to the target opening degree, wherein the restricted opening degree is a constant value.

18. The apparatus according to claim 17, wherein the EGR valve is driven by negative pressure, and the restricted opening degree is set to a value included in an opening degree range in which chattering of the EGR valve does not occur.

19. The apparatus according to claim 17, wherein the controller gradually varies the restricted opening degree from the constant value after the predetermined delay time before actuating the EGR valve to the target opening degree.

20. The apparatus according to claim 17, wherein the delay time is the time required for eliminating an excessive difference between an exhaust pressure of the exhaust passage and an intake pressure of the intake passage.

21. The apparatus according to claim 17, wherein the delay time is a constant value.

22. The apparatus according to claim 17, wherein the controller feedback controls the EGR valve so that the opening degree of the EGR valve becomes equal to the target opening degree, and the controller prohibits the feedback control when the EGR primary control is being performed.

23. The apparatus according to claim 17, wherein the engine includes a supercharger driven by exhaust gas flowing through the exhaust passage to supercharge air in the intake passage.

24. The apparatus according to claim 23, wherein the supercharger is a variable geometry turbocharger.

25. The apparatus according to claim 17, wherein the EGR primary control includes processing for maintaining the restricted opening degree at a constant value and processing for gradually increasing the restricted opening degree.

26. The apparatus according to claim 25, wherein the controller maintains the restricted opening degree at the constant value during a former part of the EGR primary control and gradually increases the restricted opening degree to the target value during a latter part of the EGR primary control.

27. The apparatus according to claim 17, wherein the restricted opening degree changes from the constant value to a variable value after the predetermined delay time before actuating the EGR valve to the target opening degree.

28. The apparatus according to claim 27, wherein the controller sets the restricted opening degree in accordance with a parameter indicating the operating state of the engine.

29. The apparatus according to claim 17, wherein the delay time is a variable value.

30. The apparatus according to claim 29, wherein the controller sets the delay time in accordance with a parameter indicating the operating state of the engine.

31. A method for controlling recirculation of exhaust gas from an exhaust passage of an engine to an intake passage of the engine, the method comprising:
varying an opening degree of the EGR valve to adjust the amount of exhaust gas recirculated from the exhaust passage to the intake passage through a recirculation passage;
obtaining a target opening degree of the EGR valve in accordance with an operating state of the engine;
controlling the EGR valve so that the opening degree of the EGR valve becomes equal to the obtained target opening degree; and
when opening the EGR valve from a fully closed state, restricting the opening degree of the EGR valve to a restricted opening degree that is smaller than the target opening degree during a predetermined delay time before actuating the EGR valve to the target opening degree, wherein the restricted opening degree is a constant value.

32. The method according to claim 31, further comprising: gradually varying the restricted opening degree from the constant value after the predetermined delay time before actuating the EGR valve to the target opening degree.

33. The method according to claim 31, wherein the EGR valve is feedback controlled so that the opening degree of the EGR valve becomes equal to the target opening degree, and the feedback control is prohibited during the delay time.

* * * * *